United States Patent
Jeon et al.

(10) Patent No.: US 8,135,069 B2
(45) Date of Patent: Mar. 13, 2012

(54) FRAME RATE CONVERSION METHOD USING MOTION INTERPOLATION

(75) Inventors: Sun-Young Jeon, Anyang-si (KR); Young-Hun Joo, Yongin-si (KR); Yong-Hyun Lim, Suwon-si (KR); Bong-Gon Kim, Seoul (KR); Yun-Je Oh, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 1209 days.

(21) Appl. No.: 11/903,180

(22) Filed: Sep. 20, 2007

(65) Prior Publication Data

US 2008/0101472 A1    May 1, 2008

(30) Foreign Application Priority Data

Oct. 31, 2006    (KR) .................. 10-2006-0106402

(51) Int. Cl.
*H04N 7/00*    (2011.01)

(52) U.S. Cl. ................................. 375/240.16

(58) Field of Classification Search ........... 375/240–241
See application file for complete search history.

(56) References Cited

U.S. PATENT DOCUMENTS

| | | | | |
|---|---|---|---|---|
| 2003/0086498 | A1* | 5/2003 | Lee et al. | 375/240.16 |
| 2003/0156641 | A1* | 8/2003 | Sohn | 375/240.02 |
| 2004/0047415 | A1* | 3/2004 | Robert et al. | 375/240.01 |

FOREIGN PATENT DOCUMENTS

| | | |
|---|---|---|
| JP | 08-116541 | 5/1996 |
| JP | 10-243401 | 9/1998 |
| KR | 2005-20287 | 3/2005 |
| KR | 2005-81730 | 8/2005 |
| KR | 10-2006-0016960 | 2/2006 |

* cited by examiner

*Primary Examiner* — Ricky Ngo
*Assistant Examiner* — Wei-Po Kao
(74) *Attorney, Agent, or Firm* — Cha & Reiter, LLC

(57) ABSTRACT

A Frame Rate Conversion (FRC) method using motion interpolation is disclosed. The FRC method includes checking the position of a motion vector intersecting an interpolated frame for each block of the interpolated frame, performing motion interpolation by acquiring a motion vector of each vertex of each block using motion vectors adjacent to each vertex, and performing motion interpolation on pixels of each block using the motion vector of each vertex.

10 Claims, 8 Drawing Sheets

(1)  (2)

(1)　　　　　　　　　(2)

FRAME RATE CONVERSION METHOD USING MOTION INTERPOLATION

CLAIM OF PRIORITY

This application claims the benefit of the earlier filing date, under 35 U.S.C. §119(a), to that patent application filed in the Korean Intellectual Property Office on Oct. 31, 2006 and assigned Serial No. 2006-106402, the entire disclosure of which is hereby incorporated by reference.

BACKGROUND OF THE INVENTION

1. Field of the Invention

The present invention generally relates to video processing and in particular, to H.264 and Moving Picture Experts Group (MPEG)-4 Frame Rate Conversion (FRC) using motion interpolation that uses motion estimation and motion compensation.

2. Description of the Related Art

Frame Rate Conversion (FRC) refers to converting a number of frames output per second, and generally to a technique for converting the frame rate of a video sequence that has been compressed at a low frame rate into a high frame rate. FRC is usually applied when a video transmission signal and a display have different frame rates and a Personal Computer (PC), a High-Definition Television (HDTV), and the like exchange programs in various signal formats.

In the early stage of FRC, various methods for converting the frame rate of an uncompressed video signal were developed and used. However, as video compression methods of the SIO/IEC JTC1 group or the ITU-T group have been developed with the sharp increase in the volume of video data, FRC is now also applied to a compressed video signal and a video system using the compressed video signal during video compression and transmission.

FIG. 1 illustrates the application of an FRC apparatus 102. Referring to FIG. 1, a video source 101 may be that of a mobile device such as a Digital Multimedia Broadcasting (DMB) device, a Personal Multimedia Player (PMP), and the like. The frame rate of the video source 101 is converted by the FRC apparatus 102 into a video source suitable for display on a display device 103.

FIG. 2 is a block diagram of a conventional FRC apparatus. Referring to FIG. 2, the FRC apparatus acquires a motion vector through block-based motion estimation and generates a new frame, i.e., an interpolated frame, through motion compensation using the motion vector. An image segmentation unit 110 segments an image of a single frame into several regions for efficient motion estimation. To this end, two stages are performed: the first one is to segment the entire frame into a changed region and an unchanged region and the second one is to segment the unchanged region into a covered region, an uncovered region, a background region, and an object region.

A motion estimation unit 120 performs motion estimation for each block using a Block Matching Algorithm (BMA). A vector smoothing unit 130 smoothes a motion vector acquired in the previous stage. A Motion Compensated Interpolation (MCI) unit 140 then completes an interpolated frame through MCI.

FIGS. 3A and 3B schematically illustrate conventional MCI using a bidirectional motion vector. More specifically, FIG. 3A illustrates an operation of setting an initial value of a bidirectional motion vector and FIG. 3B illustrates an operation of performing MCI. It should be noted that a previous frame, an interpolated frame, and a current frame illustrated in FIG. 3A are expressed along an axis that is perpendicular or parallel to a time axis.

Conventional MCI first performs motion estimation and then generates an interpolated frame using a unidirectional or bidirectional motion vector between a previous frame and a current frame. In FIGS. 3A and 3B, a bidirectional motion vector is used in order to prevent the generation of an overlap and a hole that may occur during interpolation using a forward motion vector between frames that precede and follow an interpolated frame. A block grid of an interpolated frame is appropriately set using an initial bidirectional motion vector in FIG. 3A, and motion estimation and MCI are performed with respect to the interpolated frame using a BMA for each block in FIG. 3B.

However, motion estimation and MCI using a bidirectional motion vector require a large amount of computational effort. Such computational effort is limited in mobile devices. To solve the problem of performing motion estimation and MCI in mobile devices, a method in which motion estimation is skipped and motion information is input from a decoder is under development. However, the use of MCI still requires a large amount of computation effort.

SUMMARY OF THE INVENTION

An aspect of the present invention is to address at least the above problems and/or disadvantages and to provide at least the advantages described below. Accordingly, an aspect of the present invention is to provide a method for implementing motion interpolation to make FRC suitable for a mobile device.

Another aspect of the present invention is to provide a method for interpolating a frame using motion information closer to true motion than in the case with motion estimation and motion compensation using a Blocking Matching Algorithm (BMA).

According to another aspect of the present invention, there is provided an FRC method using motion interpolation. The FRC method includes checking the position of a motion vector intersecting an interpolated frame for each of blocks of the interpolated frame, performing motion interpolation by acquiring a motion vector associated with each vertex of each block using motion vectors adjacent to each vertex, and performing motion interpolation on pixels of each block using the motion vector of each vertex.

According to another aspect of the present invention, there is provided an FRC apparatus using motion interpolation, which receives a motion vector, a previous frame, and a current frame of video data that undergoes decoding from an external decoder. The FRC apparatus includes a vector smoothing unit for smoothing the received motion vector and a motion interpolation unit for performing motion interpolation using the smoothed motion vector, the previous frame, and the current frame. The motion interpolation unit checks the position of a motion vector intersecting an interpolated frame for each block of the interpolated frame, performs motion interpolation by acquiring a motion vector of each vertex of each block using motion vectors that are adjacent to each vertex, and performs motion interpolation on each pixel of each block using a motion vector associated with each vertex of each block.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE INVENTION

The matters defined in the description such as a detailed construction and elements are provided to assist in a comprehensive understanding of an exemplary embodiment of the invention. Accordingly, those of ordinary skill in the art will recognize that various changes and modifications of the embodiment described herein can be made without departing from the scope and spirit of the invention.

Figure 1:
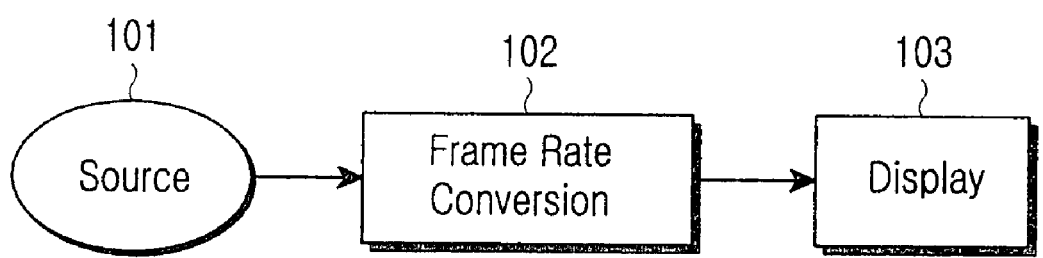
FIG. 1 is a block diagram of an image processor using a general Frame Rate Conversion (FRC) apparatus.
Figure 2:
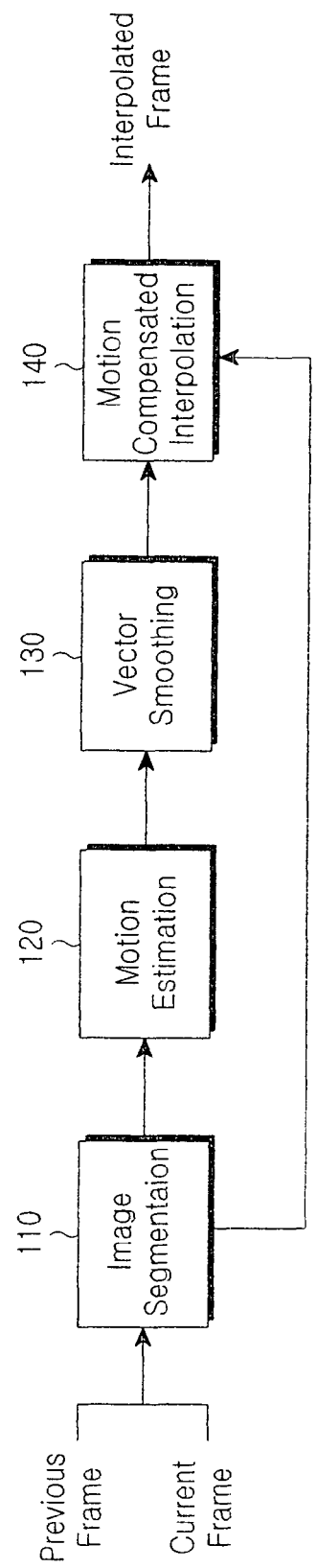
FIG. 2 is a block diagram of a conventional FRC apparatus.
Figure 3A:
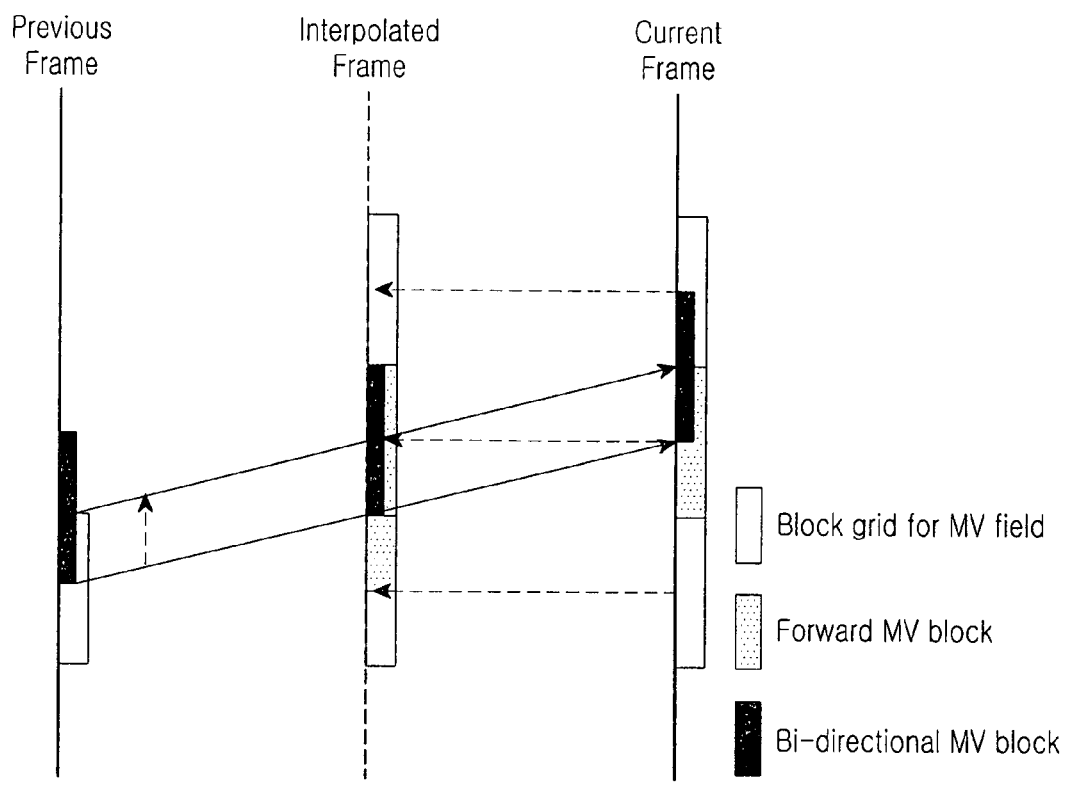
FIGS. 3A and 3B schematically illustrate conventional Motion Compensated Interpolation (MCI) using a bidirectional motion vector.
Figure 3B:
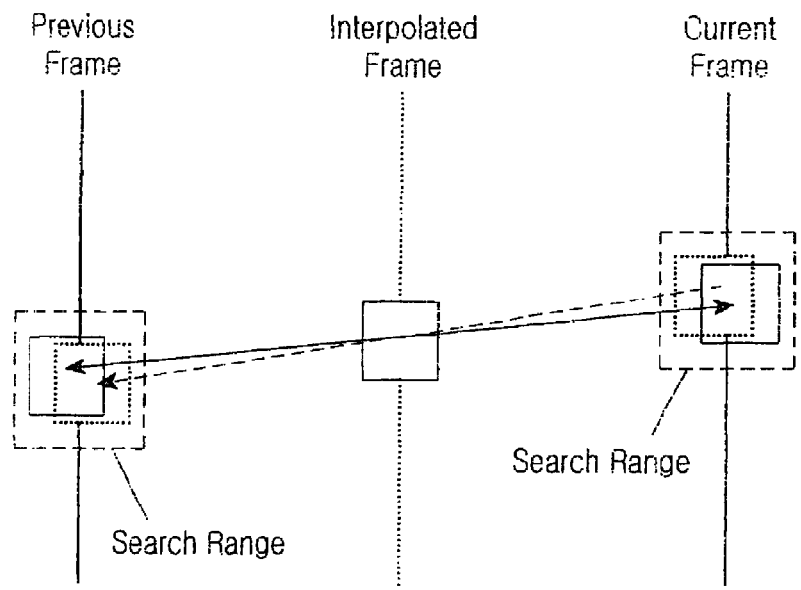
Figure 4:
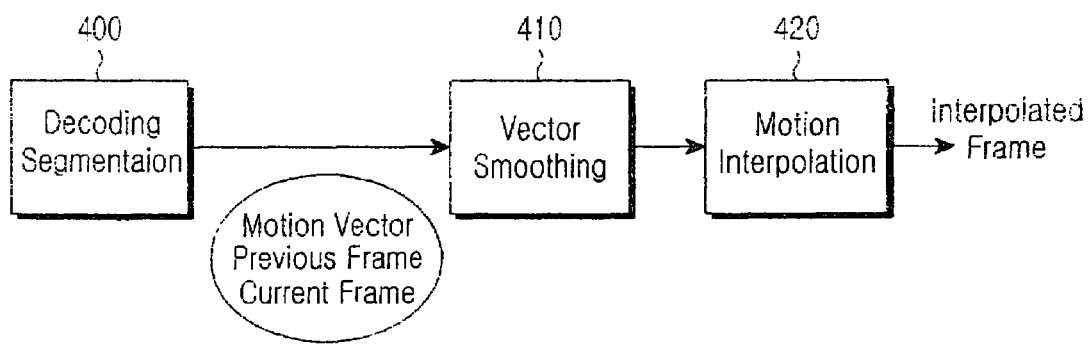
FIG. 4 is a block diagram of an FRC apparatus to which the present invention is applied.

FIG. 4 is a block diagram of a Frame Rate Conversion (FRC) apparatus to which the present invention is applied. Referring to FIG. 4, the FRC apparatus receives a motion vector, a previous frame, and a current frame of video data that undergoes decoding in a decoding unit 400 that can be implemented with a general H.264 decoder, for example. Instead of performing motion estimation, the FRC apparatus receives the motion vector directly from the decoding unit 400. A vector smoothing unit 410 smoothes the motion vector received from the decoding unit 400 to make the motion vector closer to true motion. A motion interpolation unit 420 performs motion interpolation using the smoothed motion vector, the previous frame, and the current frame.

Figure 5:
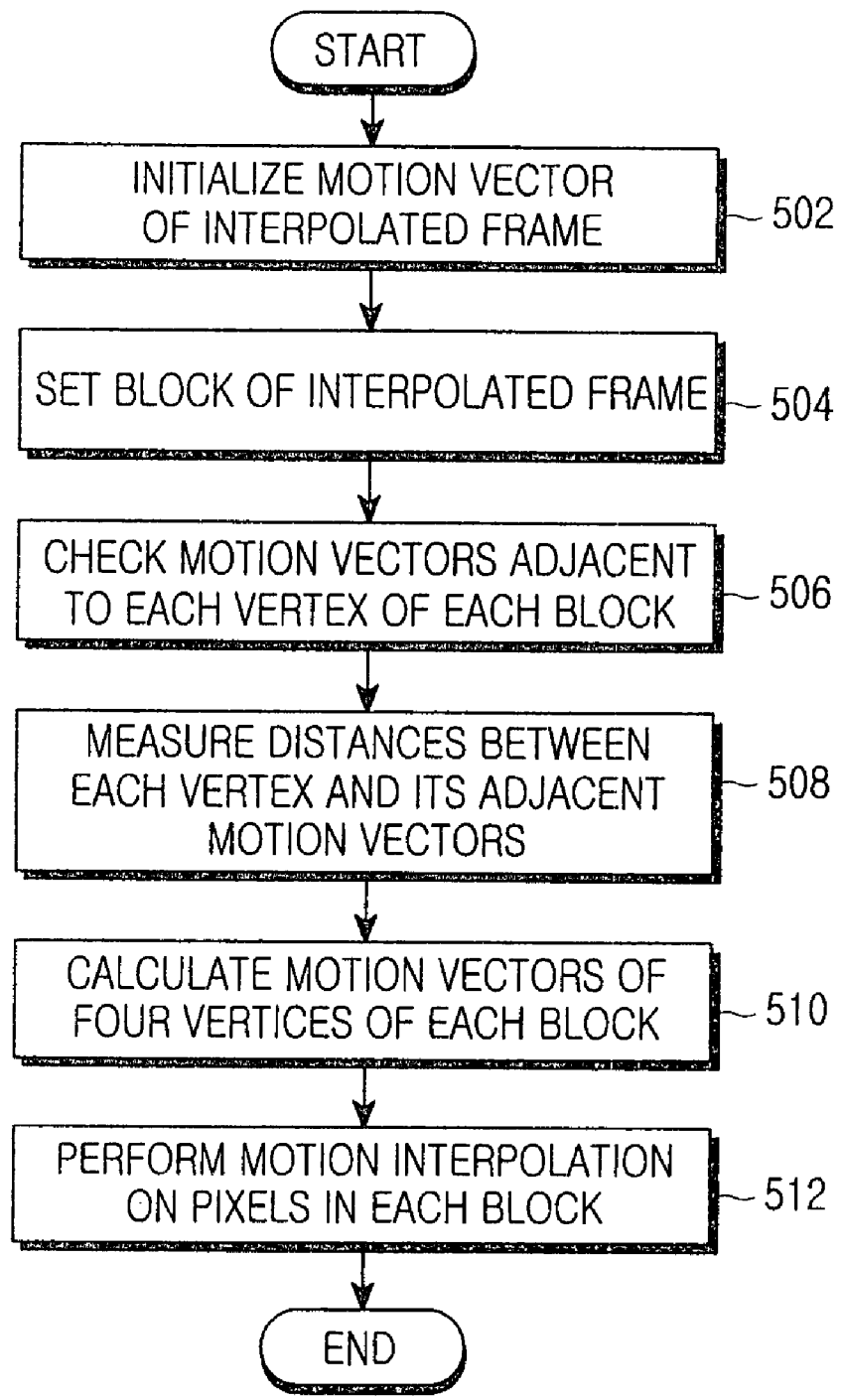
FIG. 5 is a flowchart illustrating a process of generating an interpolated frame for FRC according to an exemplary embodiment of the present invention.

FIG. 5 is a flowchart illustrating an exemplary process of generating an interpolated frame for FRC according to an embodiment of the present invention. Referring to FIG. 5, FRC according to the present invention roughly includes a process of checking the position of a motion vector intersecting the interpolated frame for each block of the interpolated frame (steps 502 and 504), a process of performing motion interpolation by acquiring motion vectors of vertices of each block using motion vectors adjacent to the vertices of the block (steps 506; 508, and 510), and a process of performing motion interpolation with respect to pixels in each block using the motion vectors of the vertices of the block (step 512). Hereinafter, these processes will be described in detail with reference to FIGS. 6 through 8.

Figure 6:
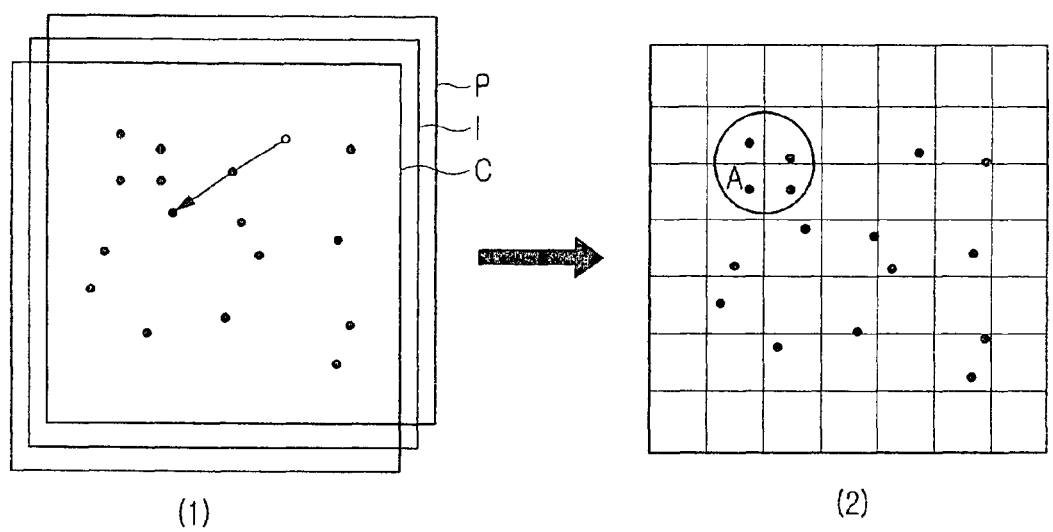
FIG. 6 is a view for explaining initialization of the position of a motion vector of an interpolated frame in FIG. 5.

First, initialization of the position of a motion vector of an interpolated frame includes initializing the motion vector of the interpolated frame (step 502) and setting a block of the interpolated frame (step 504). FIG. 6 shows a motion vector of an interpolated frame between a current frame and a previous frame, in which the previous frame is referred to as P, the current frame as C, and the interpolated frame as I.

In FIG. 6(1), a motion vector passing through the I frame and an intersection between the motion vector and the I frame are acquired. In other words, intersections between motion vectors and the I frame are marked with dots in the I frame in FIG. 6(1). After motion vectors of the interpolated frame are initialized in this way, the interpolated frame is expressed at a block level as in FIG. 6(2).

Motion interpolation performed by acquiring motion vectors of vertices of each block using motion vectors adjacent to the vertices of the block includes checking motion vectors adjacent to vertices of each block (step 506, FIG. 5), measuring distances between a vertex and its adjacent motion vectors for each block (step 508, FIG. 5), and calculating a motion vector for each of the vertices of the block using the measured distances and the adjacent motion vectors (step 510, FIG. 5).

Figure 7:
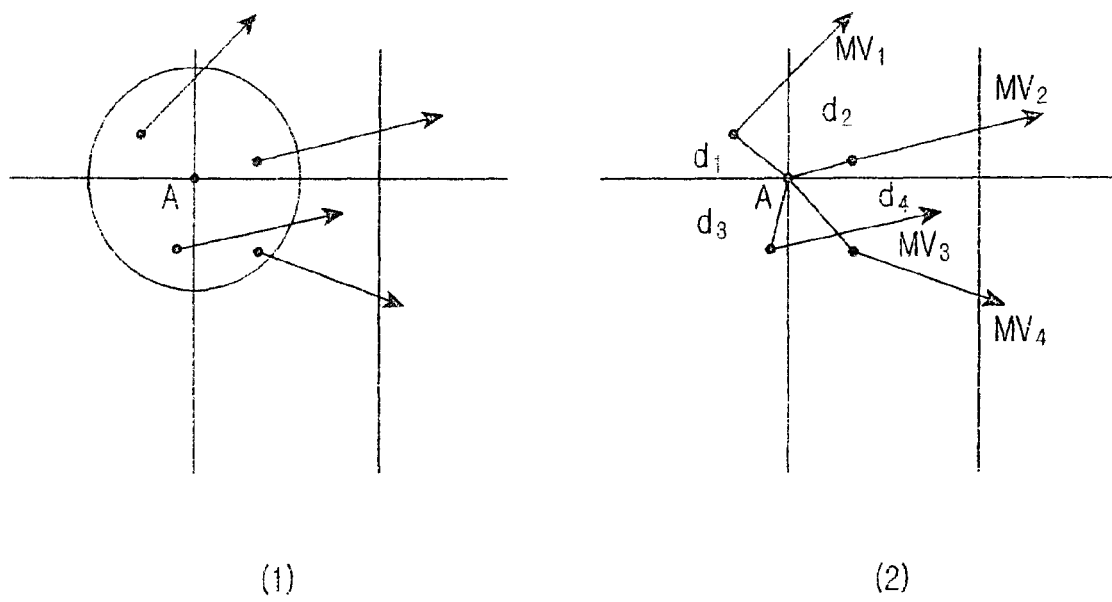
FIG. 7 is a view for explaining motion interpolation at vertices of each block using motion vectors that are adjacent to the vertices in FIG. 5.

In FIG. 6(2) and FIG. 7(1), one of the vertices of various blocks included in a frame is shown in a circle and is indicated by the letter "A." To search for motion vectors adjacent to the vertex A, points included in a circular search range with the same diameter as the block are searched for. Here, it is assumed that four points indicating motion vectors are included in the search range as illustrated in FIG. 6(2) and in FIG. 7.

As illustrated in FIG. 7(2), the four motion vectors are represented as $MV_1$, $MV_2$, $MV_3$, and $MV_4$ and distances between vertex A and the motion vectors are $d_1$, $d_2$, $d_3$, and $d_4$, respectively. Using the fact that the vertex A is affected more by a closer motion vector, a motion vector MV of the vertex A is calculated by applying weights to the four motion vectors $MV_1$, $MV_2$, $MV_3$, and $MV_4$ in which the weights are inversely proportional to the distances $d_1$, $d_2$, $d_3$, and $d_4$. The calculation can be expressed as follows:

$$MV = \frac{(d-d_1)}{d} \times MV_1 + \qquad(1)$$
$$\frac{(d-d_2)}{d} \times MV_2 + \frac{(d-d_3)}{d} \times MV_3 + \frac{(d-d_4)}{d} \times MV_4$$
$$d = d_1 + d_2 + d_3 + d_4$$

where d is a sum of the distances $d_1$, $d_2$, $d_3$, and $d_4$.

Figure 8:
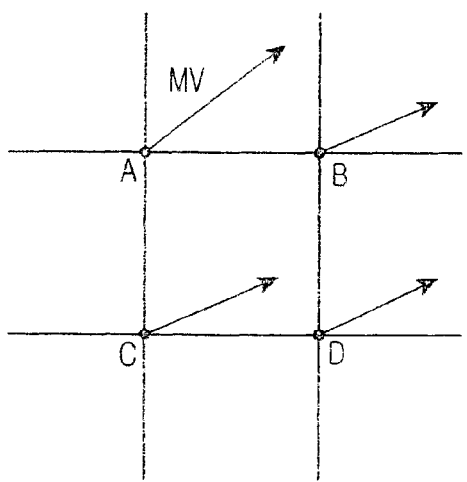
FIG. 8 is a view for explaining motion interpolation with respect to pixels in each block using motion vectors of the vertices of the block in FIG. 5.
Figure 8:
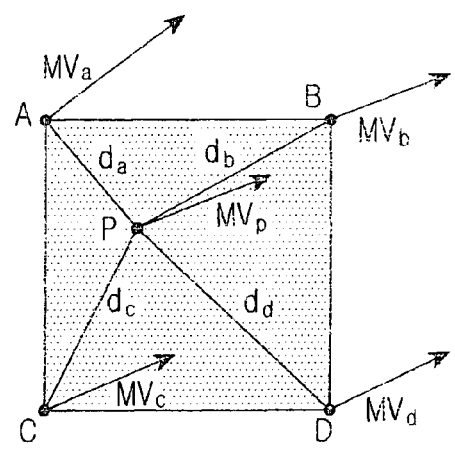

When regard to vertices located to the right, and below, vertex A, which are represented as B, C, and D, their motion vectors can be calculated as illustrated in FIG. 8(1).

After the motion vectors of the four vertices of the block are calculated, motion interpolation is performed on pixels of the block in step 512. As illustrated in FIG. 8(2), motion vectors are sequentially calculated in the order from the start pixel to the last pixel in the block by using distances between the vertices and the pixels. For example, where the motion vectors of the vertices A, B, C, and D are $MV_a$, $MV_b$, $MV_c$, and $MV_d$ and distances between a specific point (pixel) P and the vertices A, B, C, and D are $d_a$, $d_b$, $d_c$, and $d_d$, respectively, a motion vector $MV_P$ of the pixel P can be calculated as follows:

$$MV_P = \frac{(D-d_a)}{d} \times MV_a + \qquad(2)$$
$$\frac{(D-d_b)}{d} \times MV_b + \frac{(D-d_c)}{d} \times MV_c + \frac{(D-d_d)}{d} \times MV_d$$
$$D = d_a + d_b + d_c + d_d$$

In this way, motion vectors of all the pixels in each block are calculated, thereby interpolated pixels of the interpolated frame from the previous frame are acquired.

As described above, an FRC method using motion interpolation can implement motion interpolation of FRC with simplicity and high speed to make FRC suitable for a mobile device. Furthermore, interpolation of a frame using motion information closer to true motion than in the case with motion estimation and motion compensation using a Block Matching Algorithm (BMA) is performed.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to an exemplary embodiment thereof, it will be understood by those skilled in the art that various changes in form and details may be made therein without departing from the spirit and scope of the invention.

What is claimed is:

1. A Frame Rate Conversion (FRC) method using motion interpolation, the FRC method comprising the steps of:
   checking the position of a motion vector intersecting an interpolated frame for each block of the interpolated frame;
   performing motion interpolation by acquiring a motion vector of each vertex of each block using motion vectors adjacent to each vertex, wherein acquiring the motion vector comprises the steps of: checking the motion vectors that are adjacent to each vertex of each block, measuring distances between each vertex and its adjacent motion vectors for each block, and calculating a motion vector of each vertex by applying weights to the adjacent motion vectors for motion interpolation, in which the weights are inversely proportional to the measured distances; and
   performing motion interpolation on pixels of each block using the motion vector of each vertex.

2. The FRC method of claim 1, wherein the motion vector of each vertex is calculated as follows:

$$MV = \frac{(d - d_1)}{d} \times MV_1 + \frac{(d - d_2)}{d} \times MV_2 +$$
$$\frac{(d - d_3)}{d} \times MV_3 + \frac{(d - d_4)}{d} \times MV_4 + \ldots + \frac{(d - d_n)}{d} \times MV_n$$
$$d = d_1 + d_2 + d_3 + d_4 + \ldots + d_n$$

$MV_1, MV_2, MV_3, MV_4, \ldots, MV_n$ indicate the adjacent motion vectors, and $d_1, d_2, d_3, d_4, \ldots, d_n$ indicate distances between each vertex and its adjacent motion vectors.

3. The FRC method of claim 1, wherein the motion interpolation on the pixels of each block is performed as follows:

$$MV_P =$$

$$\frac{(D - d_a)}{d} \times MV_a + \frac{(D - d_b)}{d} \times MV_b + \frac{(D - d_c)}{d} \times MV_c + \frac{(D - d_d)}{d} \times MV_d$$
$$D = d_a + d_b + d_c + d_d$$

where $MV_a$, $MV_b$, $MV_c$, and $MV_d$ indicate motion vectors of vertices A, B, C, and D of each block, and $d_a$, $d_b$, $d_c$, and $d_d$, indicate distances between a specific pixel P and the vertices A, B, C, and D.

4. A Frame Rate Conversion (FRC) apparatus using motion interpolation, which receives a motion vector, a previous frame, and a current frame of video data that undergoes decoding from an external decoder, the FRC apparatus comprising:
   a vector smoothing unit for smoothing the received motion vector; and
   a motion interpolation unit for performing motion interpolation using the smoothed motion vector, the previous frame, and the current frame,
   wherein the motion interpolation unit checks the position of a motion vector intersecting an interpolated frame for each block of the interpolated frame, performs motion interpolation by acquiring a motion vector associated with each vertex of each block using motion vectors that are adjacent to each vertex, checks the adjacent motion vectors, measures distances between each vertex and its adjacent motion vectors for each block, and calculates the motion vector of each vertex by applying weights to the adjacent motion vectors for motion interpolation, in which the weights are inversely proportional to the measured distances, and performs motion interpolation on each pixel of each block using a motion vector of each vertex of each block.

5. A Frame Rate Conversion (FRC) apparatus comprising:
   a processor in communication with a memory, the processor executing code for:
   checking the position of a motion vector intersecting an interpolated frame for each block of an interpolated frame;
   performing motion interpolation by acquiring a motion vector of each vertex of each block using motion vectors adjacent to each vertex, wherein acquiring of the motion vector comprises the step of: checking the motion vectors that are adjacent to each vertex of each block, measuring distances between each vertex and its adjacent motion vectors for each block, and calculating a motion vector of each vertex by applying weights to the adjacent motion vectors for motion interpolation, in which the weights are inversely proportional to the measured distances; and
   performing motion interpolation on pixels of each block using the motion vector of each vertex.

6. The apparatus of claim 5, wherein the motion vector of each vertex is calculated as follows:

$$MV = \frac{(d - d_1)}{d} \times MV_1 + \frac{(d - d_2)}{d} \times MV_2 +$$
$$\frac{(d - d_3)}{d} \times MV_3 + \frac{(d - d_4)}{d} \times MV_4 + \ldots + \frac{(d - d_n)}{d} \times MV_n$$
$$d = d_1 + d_2 + d_3 + d_4 + \ldots + d_n$$

$MV_1, MV_2, MV_3, MV_4, \ldots, MV_n$ indicate the adjacent motion vectors, and $d_1, d_2, d_3, d_4, \ldots, d_n$ indicate distances between each vertex and its adjacent motion vectors.

7. The apparatus of claim 5, wherein the motion interpolation on the pixels of each block is performed as follows:

$$MV_P = \frac{(D-d_a)}{d} \times MV_a + \frac{(D-d_b)}{d} \times MV_b + \frac{(D-d_c)}{d} \times MV_c + \frac{(D-d_d)}{d} \times MV_d$$
$$D = d_a + d_b + d_c + d_d$$

where $MV_a$, $MV_b$, $MV_c$, and $MV_d$ indicate motion vectors of vertices A, B, C, and D of each block, and $d_a$, $d_b$, $d_c$, and $d_d$, indicate distances between a specific pixel P and the vertices A, B, C, and D.

8. A computer program product, comprising non-transitory recoding medium, providing code, which when loaded into a processor causes the processor to execute the steps of:
   checking the position of a motion vector intersecting an interpolated frame for each block of an interpolated frame;
   performing motion interpolation by acquiring a motion vector of each vertex of each block using motion vectors adjacent to each vertex wherein acquiring the motion vector comprises the steps of: checking the motion vectors that are adjacent to each vertex of each block, measuring distances between each vertex and its adjacent motion vectors for each block, and calculating a motion vector of each vertex by applying weights to the adjacent motion vectors for motion interpolation, in which the weights are inversely proportional to the measured distances; and
   performing motion interpolation on pixels of each block using the motion vector of each vertex.

9. The product of claim 8, wherein the motion vector of each vertex is calculated as follows:

$$MV = \frac{(d-d_1)}{d} \times MV_1 + \frac{(d-d_2)}{d} \times MV_2 + \frac{(d-d_3)}{d} \times MV_3 + \frac{(d-d_4)}{d} \times MV_4 + \ldots + \frac{(d-d_n)}{d} \times MV_n$$
$$d = d_1 + d_2 + d_3 + d_4 + \ldots + d_n$$

$MV_1$, $MV_2$, $MV_3$, $MV_4$, ..., $MV_n$ indicate the adjacent motion vectors, and $d_1$, $d_2$, $d_3$, $d_4$, ..., $d_n$ indicate distances between each vertex and its adjacent motion vectors.

10. The product of claim 8, wherein the motion interpolation on the pixels of each block is performed as follows:

$$MV_P = \frac{(D-d_a)}{d} \times MV_a + \frac{(D-d_b)}{d} \times MV_b + \frac{(D-d_c)}{d} \times MV_c + \frac{(D-d_d)}{d} \times MV_d$$
$$D = d_a + d_b + d_c + d_d$$

where $MV_a$, $MV_b$, $MV_c$, and $MV_d$ indicate motion vectors of vertices A, B, C, and D of each block, and $d_a$, $d_b$, $d_c$, and $d_d$, indicate distances between a specific pixel P and the vertices A, B, C, and D.

* * * * *